United States Patent [19]
Sorenson

[11] Patent Number: 5,556,562
[45] Date of Patent: Sep. 17, 1996

[54] WELDING ASSEMBLY

[75] Inventor: John C. Sorenson, Bloomington, Minn.

[73] Assignee: J. W. Harris Co., Inc., Cincinnati, Ohio

[21] Appl. No.: 354,416

[22] Filed: Dec. 12, 1994

[51] Int. Cl.[6] .................................................. B23K 9/24
[52] U.S. Cl. ............................................... 219/137.61
[58] Field of Search ............................. 219/137.61, 136

[56] References Cited

U.S. PATENT DOCUMENTS

| | | | |
|---|---|---|---|
| 2,735,920 | 2/1956 | Valliere | 219/137.61 |
| 3,366,774 | 1/1968 | Nuss et al. | 219/137.61 |
| 4,575,612 | 3/1986 | Prunier | 219/137.43 |
| 5,340,658 | 8/1994 | Komatsu et al. | 428/558 |

FOREIGN PATENT DOCUMENTS 63-72483  4/1988  Japan ........................ 219/137.61

*Primary Examiner*—Clifford C. Shaw
*Attorney, Agent, or Firm*—Palmatier, Sjoquist & Helget, P.A.

[57] ABSTRACT

An improved welding assembly for metal inert gas welding wherein the welding assembly includes a continuous filler metal wire electrode, which is electrically charged and passed through a contact tip generally of a cylindrical shape with a central aperture or tunnel therethrough while the work piece is oppositely charged. The improvement is in the composition of the contact tip in that the tip is made of copper and carbon.

27 Claims, 2 Drawing Sheets

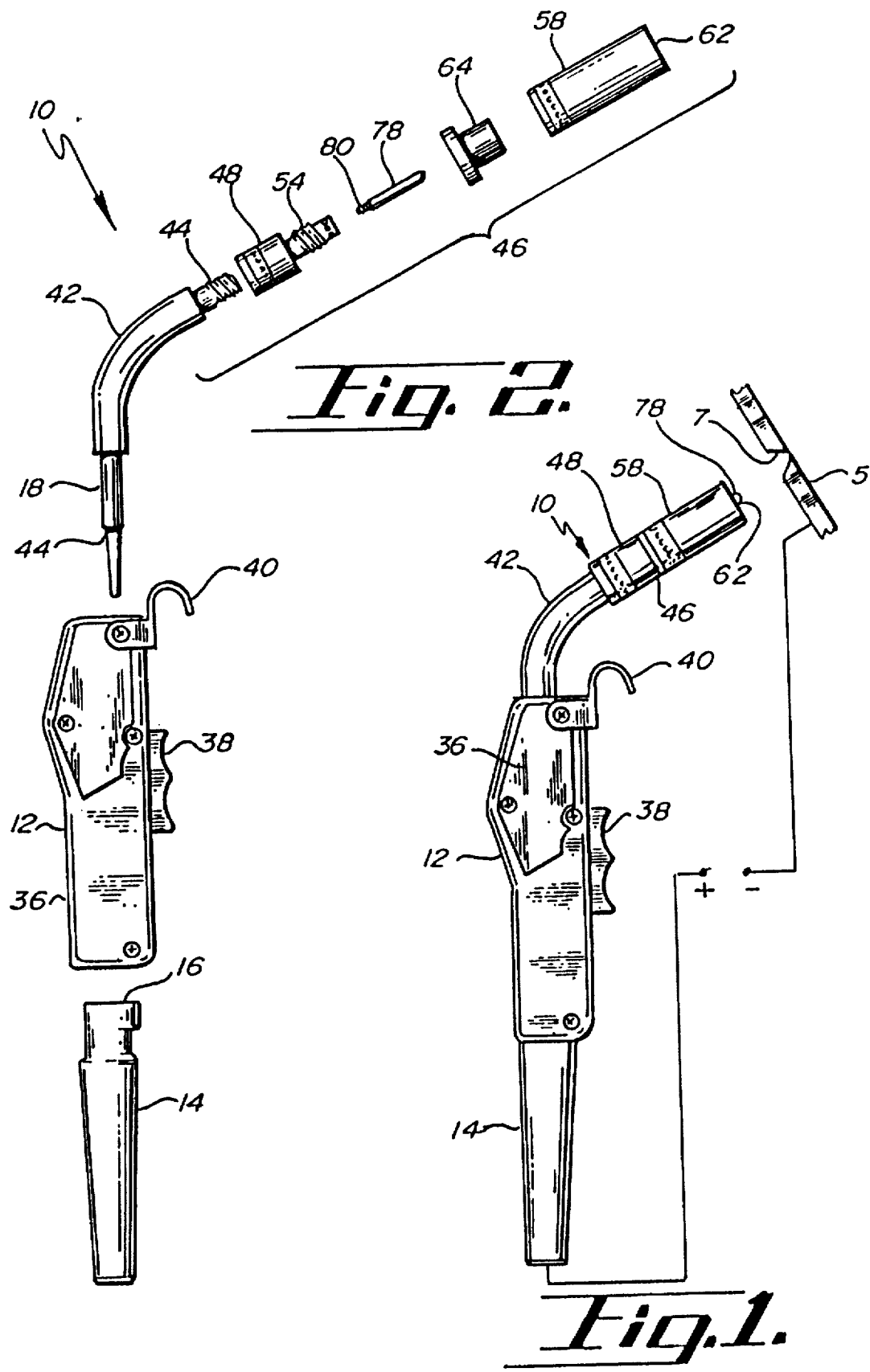

5,556,562

WELDING ASSEMBLY

BACKGROUND OF THE INVENTION

This invention relates to welding apparati or installations, and more particularly to a new contact tip made of copper and carbon wherethrough a continuous metal wire electrode is passed through and charged to create the filler metal on the work piece.

In welding methods of this general category, the filler metal or metal wire is unwound from a reel and is automatically regulated or fed into the welding assembly as the filler metal is consumed. The filler metal wire has a cast, which is arcuate in nature, as it is formed and wound on the reel and is desirable to maintain good electrical continuity between the wire and the contact tip. Drive rollers are often used to feed the wire off the reel and into the welding mechanism. The wire must be moved along the weld line smoothly and without jerking for accurate and high performance welding to be satisfactorily achieved.

Traditionally, the wire of filler metal is guided by a copper tube or contact tip having a bore with a rear opening through which the wire enters the contact tip and front opening through which a short length of the wire projects to be presented in a suitable position next to the weld zone. In many methods and apparati, a welding machine further includes a nozzle for blowing an inert or active gas over the weld zone to keep it under a controlled atmosphere. This avoids unwanted reactions of the molten filler metal and work piece material with the surrounding air or possibly with the gases evolved by the welding operation.

In high performance welding machines, the position relative to the weld of both the gas nozzle and of the system for feeding the filler wire to the weld zone are adjustable under the control of an automatic regulator apparatus which further may include drive rolls for moving the wire through the welding apparatus and along the weld line. The automatic regulator apparatus maintains certain parameters of welding operation beyond the filler metal feed to include the arc current thereby optimizing operating conditions.

In high performance and accurate welding, efficiency in labor is measured by arc or actual welding time. Typical actual arc time may be forty to sixty percent of the laborer's time on the job. The time in which the laborer is not welding generally relates to the difficulty of use of the welding apparatus together with the deterioration of the metal contact tip or tube.

In particular, at the end of the filler metal wire after a breakaway from the last weld is located a ball or glob of filler metal. With the ball at the end of the wire and the welder ready to begin a new weld bead, the automatic regulator apparatus senses the need for a high power surge or amperage which is necessary to burn off the ball and to permit accurate and high performance welding. A high current surge at the beginning of the weld often causes burn back of the filler metal into the contact tip with resulting fusion of the wire and contact tip. Also, the current surge at the beginning of the weld can cause the contact tip to greatly heat up and possibly overheat. This is particularly true where the contact tube is also used to supply electricity to the filler metal as well as to guide the filler metal wire. Overheating of the contact tip causes tip expansion and contraction of the hole, tunnel or aperture therethrough, thereby restricting or causing friction or resistance in the feeding of the wire through the tip. This will affect the drive rolls on the wire and cause skidding which in turn causes flat spots on the wire which may further affect and fluctuate the arc length.

Also occurring within the aperture of the contact tip is wear caused by friction due to the cast of the wire and by flat or uneven surfaces in the wire itself. This creates elongation and unevenness in the aperture through the contact tip which in turn also causes parasitic electric arcs within the tip itself. This affects the welding performance as well as the beginning of deterioration of the contact tip by way of oxidation, overheating, reduced continuity between the metal filler wire and contact tip, and increased amperage and creation of micropores inside the tunnel or aperture of the tip. In this situation, the welding apparatus may begin to operate erratically, affecting the arc length, and the tip of the filler metal wire may actually burn back and weld itself within the contact tube and the automatic regulation mechanism ceases to operate correctly, effectively and completely shutting down the welding apparatus or assembly. A shut down of the welding apparatus is commonly associated with some problems in the feeding or drive rolls which may have skidded on the filler metal wire causing flat spots which must be dealt with once the welding assembly is again operational. These difficulties lead to the contact tip or guide tubes needing to be replaced frequently which is an expensive operation since it halts production and constitutes a large amount of labor time and further consumes a large number of contact tips. Additionally, weld quality is adversely affected when the filler metal drive mechanism becomes erratic due to drive roll skidding.

Attempts have been made to improve the electric contact between the wire filler metal and the contact tip such as with biased ball bearings within the contact tip or placing a protective refractory material over the end and side walls of the contact tip where the filler metal wire exits the tip acting as an insulator with no electrical continuity close to the welding arc where it is most efficient. Further, these mechanisms are too complex and do not stand up well to the very high operating temperatures of the contact tubes.

There is a need for an improved contact tip that provides for good continuity with a smoother, more even arc due to contact tip tunnel or aperture lubricity as associated with carbon, and reduced coefficient of expansion. Such a tip should have a longer tip life, cooler operation and thus a longer arc time for the laborer. Such a tip should have high electrical conductivity with low thermal conductivity, a high melting point and an excellent thermal shock resistance and improved lubricity. Such a tip may be easily manufactured by injection molding or simple machining to reduce costs.

SUMMARY OF THE INVENTION

An improved welding assembly for metal inert gas welding wherein the welding assembly includes a continuous filler metal wire electrode, which is electrically charged and passed through a contact tip generally of a cylindrical shape with a central aperture or tunnel therethrough while the work piece is oppositely charged. The improvement is in the composition of the contact tip in that the tip is made of copper and carbon.

A principal object and advantage of the improved welding tip is that it provides for increased arc time for the welding apparatus and laborer as well as more accurate performance and improved weld quality.

Another object and advantage of the present invention is that the carbon provides lubricity within the aperture or tunnel of the contact tip to reduce tip hole elongation and a smoother, more even arc due to a closer contact tip hole tolerance and reduced arcing inside the contact tip due to a reduced coefficient of expansion, improved continuity, higher melting point, greater conductivity, reduced friction and cooler running.

Another object and advantage of the present invention is the contact tip improvements reduce filler wire metal feeding problems and resulting labor reduction.

Another object and advantage of the present invention is that the contact tip is less prone to oxidation and burn back into the tip due to the addition of carbon to the contact tip composition, which is not metallurgically miscible with molten filler wire materials.

Another object and advantage of the present invention is that the improved contact tip is comprised of a copper and carbon alloy which may be efficiently molded as well as machined to greatly reduce the cost of its manufacture.

Other objects and advantages will become readily apparent upon study of the following specification, claims and appended figures.

BRIEF DESCRIPTION OF THE DRAWINGS

FIG. 1 is a front elevational view of a portion of the welding assembly;

FIG. 2 is an exploded view of the assembly; and

DETAILED SPECIFICATION

Figure 3:
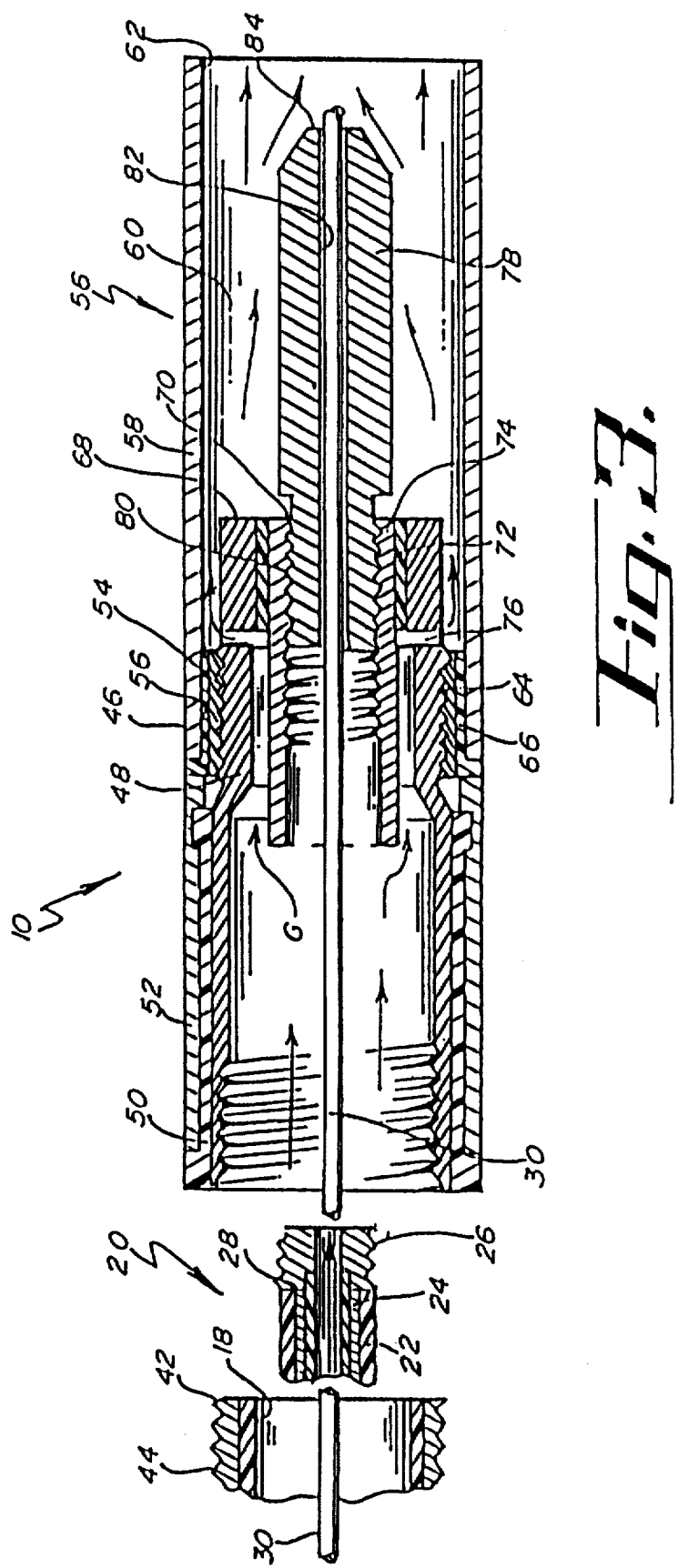
FIG. 3 is a cross sectional view of the assembly.

Referring to FIGS. 1–3, the metal inert gas (MIG) welding assembly 10 may be seen. The assembly 10 generally includes a gun 12 having a hose 14 connected to it. From the gun 12 extends the conductor tube 42 which is further connected to the nozzle assembly 46. As may be understood, a work piece 5 is positioned in front of the nozzle assembly 46 and is grounded. A continuous filler metal wire 30 is fed through the hose 14 into the gun 12 and out nozzle assembly 46 through an electrical contact tip or tube 78 to deposit filler metal 30 at the weld gap 7. The assembly 10 is operated by the trigger 38 which feeds both inert gas G and wire 30 to the weld gap or line 7.

More specifically, the welding assembly 10 includes a commonly called gun 12 which is grippable by the laborer. Gas G and continuous welding wire 30 are fed through hose 14 under the control of an automatic regulator or drive apparatus (not shown) but is well known. Hose 14 includes a threaded fitting for securement in gun 12. Gun 12 also has a handle 36 and a trigger or on/off switch 38. Handle 36 also may include a hanger 40 for hanging the assembly 10 when not in use.

Forward of gun 12 is a conductor tube 42 which conveniently may be arcuate for the particular laborer and welding application. Conductor tube 42 is threaded on both ends 44. Connected to the conductor tube 42 is nozzle assembly 46.

Nozzle assembly 46 includes a gas diffuser 48 which is threadable with the threaded end 44 of conductor tube 42. The gas diffuser 48 has an insulating collar 50 for support of an outer metal sleeve 52 in an electrically insulated arrangement. Forwardly on the gas diffuser 48 is an intermediate threaded portion 54 for connection of the nozzle insulator assembly 56 which supports nozzle 58 in an insulated fashion. Nozzle 58 includes an interior 60 with a tip opening 62. At the opposite end is a threaded press fit fitting 64 which is insulated from the nozzle 58 by insulation 56.

At the tip end 68 of the gas diffuser 48 is an aperture 70 which firstly has an insulation collar 72 placed therein and which receives a press fitted, threaded tip fitting 74. Gas diffuser 48 also includes gas diffusion apertures 76 for conducting gas from the hose 14, through gun 12, conductor tube 42, nozzle assembly 46 and out nozzle 58. Within nozzle 58 is located the contact tip or tube 78 which includes the improvement of Applicant's invention.

The contact tip or conductor tube 78 has a threaded end 80 which is securable in tip fitting 74 supported in the gas diffuser 48. Contact tip 78 has an aperture or tunnel 82 therethrough with a tip arc end 84. Applicant has found that the contact tip 78 may be machined or injection molded of an alloy comprised of approximately 91% copper and 9% carbon. However, the carbon content may be increased up to 40% and the conductor tube 18 will still be functional. With overly increased carbon content, the contact tip 78 has a tendency to be too brittle and more subject to breakage.

In operation, the welding assembly 10 is turned on and the automatic wire drive apparatus engaged. With actuation of trigger 38, filler metal wire 30 is fed through gun 12 from hose 14 while inert gas G is directed to the weld gap 7. It may be appreciated that wire 30 is moved along by drive rollers and receives an electrical charge as it passes into contact tip 78. Because contact tip 78 is made of an alloy of copper and carbon, the tip has excellent lubricity characteristics in the tunnel 82. The carbon content of contact tip 78 offers high electrical conductivity with minimal internal arcing, tip degradation or oxidation and long life while yet running cooler. The carbon content in the contact tip 78 disrupts the metallurgical miscibility of the contact tip material 78 and the welding wire 30 should burn back conditions occur for any reason. Thus, improved actual arc time for the laborer may be appreciated suitably in excess of 60% of labor time as heretofore not known with minimal maintenance work and only occasional replacement of contact tip 78 which is not subject to burn back or contact tip clogging.

The following table of examples shows the various percentages of copper and carbon by weight with which the contact tip 78 may preferably be comprised:

| Example No. | % wt. - Copper | % wt. - Carbon |
| --- | --- | --- |
| 1 | 98%–60% | 2%–40% |
| 2 | 97%–70% | 3%–30% |
| 3 | 96%–80% | 4%–20% |
| 4 | 95%–85% | 5%–15% |
| 5 | 94%–85% | 6%–15% |
| 6 | 93%–85% | 7%–15% |
| 7 | 92%–85% | 8%–15% |
| 8 | 91%–85% | 9%–15% |
| 9 | 90%–85% | 10%–15% |
| 10 | 91% | 9% |
| 11 | 99%–50% | 1%–50% |

The present invention may be embodied in other specific forms without departing from the spirit of essential attributes thereof; therefore, the illustrated embodiment should be considered in all respects as illustrative and not restrictive, reference being made to the appended claims rather than to the foregoing description to indicate the scope of the invention.

What is claimed is:

1. An improved welding assembly wherein the welding assembly includes a continuous metal wire electrode which is charged and passed through a contact tip while a work piece is oppositely charged, the improvement comprising the contact tip being made of an alloy of 99% to 50% copper and 1% to 50% carbon, the copper component providing high electrical conductivity throughout the contact tip and the carbon component providing increased lubricity throughout the contact tip.

2. The improved assembly of claim 1, wherein the improvement comprises the contact tip being made of 98% to 60% copper and 2% to 40% carbon.

3. The improved assembly of claim 1, wherein the improvement comprises the contact tip being made of 97% to 70% copper and 3% to 30% carbon.

4. The improved assembly of claim 1, wherein the improvement comprises the contact tip being of 96% to 80% copper and 4% to 20% carbon.

5. The improved assembly of claim 1, wherein the improvement comprises the contact tip being made of 95% to 85% copper and 5% to 15% carbon.

6. The improved assembly of claim 1, wherein the improvement comprises the contact tip being made of 94% to 85% copper and 6% to 15% carbon.

7. The improved assembly of claim 1, wherein the improvement comprises the contact tip being made of 93% to 85% copper and 7% to 15% carbon.

8. The improved assembly of claim 1, wherein the improvement comprises the contact tip being made of 92% to 85% copper and 8% to 15% carbon.

9. The improved assembly of claim 1, wherein the improvement comprises the contact tip being made of 91% to 85% copper and 9% to 15% carbon.

10. The improved assembly of claim 1, wherein the improvement comprises the contact tip being made of 90% to 85% copper and 10% to 15% carbon.

11. The improved assembly of claim 1, wherein the improvement comprises the contact tip being made of 91% copper and 9% carbon.

12. The improved assembly of claim 1, wherein the contact tip is generally of a cylindrical shape with a central aperture therethrough.

13. The improved assembly of claim 1, wherein the contact tip is manufactured from a processes group comprised of molding and machining.

14. An improved welding assembly for metal inert gas welding wherein the welding assembly includes a continuous metal wire electrode which is charged and passes through a contact tip generally of a cylindrical shape with a central aperture therethrough while a work piece is oppositely charged, the improvement comprising the contact tip being made of an alloy of copper and carbon, the copper component providing high electrical conductivity throughout the contact tip and the carbon component providing increased lubricity throughout the contact tip.

15. The improved welding assembly of claim 14, wherein the improvement comprises the contact tip being of 99% to 50% copper and 1% to 50% carbon.

16. The improved assembly of claim 14, wherein the improvement comprises the contact tip being made of 98% to 60% copper and 2% to 40% carbon.

17. The improved assembly of claim 14, wherein the improvement comprises the contact tip being made of 97% to 70% copper and 3% to 30% carbon.

18. The improved assembly of claim 14, wherein the improvement comprises the contact tip being of 96% to 80% copper and 4% to 20% carbon.

19. The improved assembly of claim 14, wherein the improvement comprises the contact tip being made of 95% to 85% copper and 5% to 15% carbon.

20. The improved assembly of claim 14, wherein the improvement comprises the contact tip being made of 94% to 85% copper and 6% to 15% carbon.

21. The improved assembly of claim 14, wherein the improvement comprises the contact tip being made of 93% to 85% copper and 7% to 15% carbon.

22. The improved assembly of claim 14, wherein the improvement comprises the contact tip being made of 92% to 85% copper and 8% to 15% carbon.

23. The improved assembly of claim 14, wherein the improvement comprises the contact tip being made of 91% to 85% copper and 9% to 15% carbon.

24. The improved assembly of claim 14, wherein the improvement comprises the contact tip being made of 90% to 85% copper and 10% to 15% carbon.

25. The improved assembly of claim 14, wherein the improvement comprises the contact tip being made of 91% copper and 9% carbon.

26. The improved assembly of claim 14, wherein the contact tip is generally of a cylindrical shape with a central aperture therethrough.

27. The improved assembly of claim 14, wherein the contact tip is manufactured from a processes group comprised of molding and machining.

* * * * *

UNITED STATES PATENT AND TRADEMARK OFFICE
CERTIFICATE OF CORRECTION

PATENT NO. : 5,556,562
DATED : September 17, 1996
INVENTOR(S) : John C. Sorenson It is certified that error appears in the above-identified patent and that said Letters Patent is hereby corrected as shown below:

Column 1, line 40, please delete the word "are" and insert in its place --arc--.

Column 2, line 40, please delete the word "are" and insert in its place --arc--.

Signed and Sealed this

Tenth Day of December, 1996

Attest:

BRUCE LEHMAN

Attesting Officer

Commissioner of Patents and Trademarks